(12) United States Patent
Nakamura

(10) Patent No.: US 8,233,064 B2
(45) Date of Patent: Jul. 31, 2012

(54) SOLID-STATE IMAGE PICKUP APPARATUS, METHOD OF MANUFACTURING THE SAME, AND ELECTRONIC DEVICE INCLUDING THE SAME

(75) Inventor: Masao Nakamura, Fukuyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 801 days.

(21) Appl. No.: 12/315,327

(22) Filed: Dec. 2, 2008

(65) Prior Publication Data

US 2009/0141165 A1    Jun. 4, 2009

(30) Foreign Application Priority Data

Dec. 3, 2007    (JP) ................. 2007-312764

(51) Int. Cl.
*H04N 3/14* (2006.01)
*H04N 5/235* (2006.01)
*H04N 5/225* (2006.01)

(52) U.S. Cl. ........... 348/294; 348/230.1; 348/340

(58) Field of Classification Search ........... 348/294, 348/298, 230.1, 272, 340
See application file for complete search history.

(56) References Cited

U.S. PATENT DOCUMENTS

| | | |
|---|---|---|
| 2005/0139848 A1 | 6/2005 | Yee |
| 2006/0208182 A1 | 9/2006 | Tsukamoto |
| 2007/0109439 A1 | 5/2007 | Minamio |
| 2009/0147115 A1 * | 6/2009 | Tanida et al. ........... 348/294 |

FOREIGN PATENT DOCUMENTS

| | | | |
|---|---|---|---|
| JP | 2002-43451 A | | 2/2002 |
| JP | 2002-204400 A | | 7/2002 |
| JP | 2002-231916 | * | 8/2002 |
| JP | 2005-197717 A | | 7/2005 |
| JP | 2005-244116 A | | 9/2005 |
| JP | 2006-128647 A | | 5/2006 |
| JP | 2006-245246 A | | 9/2006 |
| JP | 2007-142058 A | | 6/2007 |

* cited by examiner

*Primary Examiner* — Thomas K Pham
*Assistant Examiner* — Brandi Thomas
(74) *Attorney, Agent, or Firm* — Edwards Wildman Palmer LLP; David G. Conlin; David A. Tucker (57) ABSTRACT

In a solid-state image pickup apparatus 100 of the invention, a transparent member 4 that covers a light receiving section of a solid-state image sensing device 2 is located within an opening 10 of a wiring board 1. The solid-state image sensing device 2 is adhered to the backside of the wiring board 1 via a conductive member 5 and also sealed to the backside of the wiring board 1 with an encapsulation resin 6 formed around the solid-state image sensing device 2. Furthermore, a through-hole 11 passing through the wiring board 1 in a thickness direction is formed on outside of the opening 10 of the wiring board 1, and the through-hole 11 is filled with the encapsulation resin 6. This configuration provides the solid-state image pickup apparatus 100 in which the encapsulation resin 6 can be easily injected to the surrounding area of the solid-state image sensing device 2.

10 Claims, 5 Drawing Sheets

SOLID-STATE IMAGE PICKUP APPARATUS, METHOD OF MANUFACTURING THE SAME, AND ELECTRONIC DEVICE INCLUDING THE SAME

This Nonprovisional application claims priority under 35 U.S.C. §119(a) on Patent Application No. 312764/2007 filed in Japan on Dec. 3, 2007, the entire contents of which are hereby incorporated by reference.

FIELD OF THE INVENTION

The present invention relates to a solid-state image pickup apparatus, a method for manufacturing the solid-state image pickup apparatus, and an electronic device including the solid-state image pickup apparatus.

BACKGROUND OF THE INVENTION

On a solid-state image pickup apparatus for imaging, a solid-state image sensing device (CCD (charge-coupled device) or CMOS (complementary metal-oxide semiconductor) sensor IC (integrated circuits)) is mounted. The solid-state image pickup apparatus is used for mobile terminals such as communication equipments, including a mobile phone. Recently, mobile terminals have been increasingly becoming smaller and thinner, which resulted in a higher need for the solid-state image pickup apparatus to be thinner and smaller.

Figure 8:
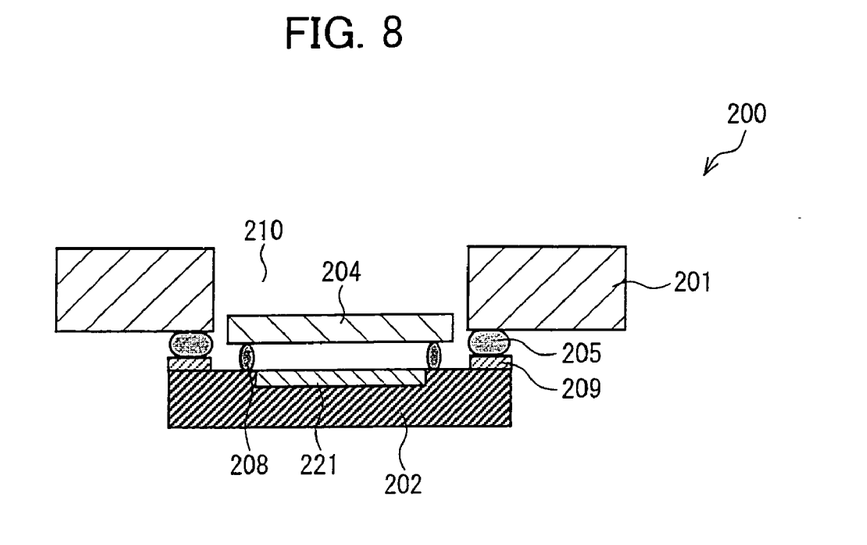
FIG. 8 is a cross-sectional view of a solid-state image pickup apparatus of the patent document 1.
Figure 9:
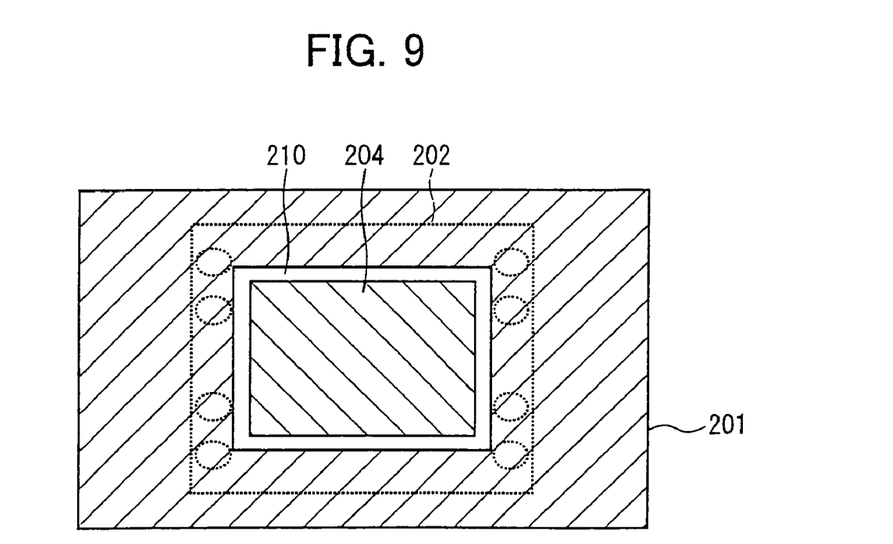
FIG. 9 is a top view of the solid-state image pickup apparatus of FIG. 8.

Depending on the need, a solid-state image pickup apparatus made aiming for being thinner and smaller has been disclosed in patent document 1. FIG. 8 shows a cross-sectional view of the solid-state image pickup apparatus in the patent document 1. FIG. 9 shows a schematic view of a front side of the solid-state image pickup apparatus in the patent document 1.

As shown in FIGS. 8 and 9, in a solid-state image pickup apparatus 200 of the patent document 1, a transparent member 204 is placed above a solid-state image sensing device 202 in such a manner that the transparent member 204 covers a light receiving section 221 of the solid-state image sensing device 202. Furthermore, an electrode pad 209 of the solid-state image sensing device 202 and a wiring board 201 are connected with each other via a conductive member 205. In the solid-state image pickup apparatus 200 as such, the transparent member 204 is inserted in an opening 210 of the wiring board 201, and a top surface of the transparent member 204 is located within the opening 210.

However, in the solid-state image pickup apparatus of the patent document 1, there is a problem in which it is difficult to inject an encapsulation resin into a surrounding area of the solid-state image sensing device.

Specifically, in the solid-state image pickup apparatus of the patent document 1, no through-hole, via which the encapsulation resin is injected, is formed on the wiring board. Therefore, when the encapsulation resin is to be formed around the solid-state image sensing device in the patent document 1, the encapsulation resin is required to be injected to the solid-state image sensing device sideways. However, it is very difficult to inject the encapsulation resin to such an extremely small member as the solid-state image sensing device sideways. That is, in the configuration of the patent document 1, once the solid-state image sensing device is connected to the wiring board via the electrode and the conductive member, it is difficult to reinforce the connection afterwards.

As shown in FIG. 8, in the configuration of the solid-state image pickup apparatus 200, the electrode pad 209 of the solid-state image sensing device 202 and the wiring board 201 are connected with each other only via the conductive member 205. This means the connection between the solid-state image sensing device 202 and the wiring board 201 is not so strong, which leads to a state in which the solid-state image sensing device 202 is easily fallen off from the wiring board 201.

Patent Document 1

Japanese Unexamined Patent Application Publication, Tokukai, No. 2002-43451 (disclosed on Feb. 8, 2002)

SUMMARY OF THE INVENTION

The invention is made to solve the above problem, and an object of the invention is to provide a solid-state image pickup apparatus, in which it is possible to easily inject the encapsulation resin to a surrounding area of the solid-state image sensing device. Moreover, a further object of the invention is to provide a solid-state image pickup apparatus, in which the connection between the solid-state image sensing device and a wiring board is strong.

In order to achieve the objects above, a solid-state image pickup apparatus according to the present invention comprises:

a solid-state image sensing device;

a wiring board including wiring to be electrically connected to the solid-state image sensing device, and having an opening passing through the wiring board in a thickness direction; and    a transparent member provided above the solid-state image sensing device in such a manner that the transparent member covers a light receiving section of the solid-state image sensing device with a space between the transparent member and the light receiving section,    at least a part of the transparent member being located within the opening of the wiring board; and    the solid-state image sensing device having a light receiving surface adhered to a backside of the wiring board,    wherein the solid-state image sensing device is sealed to the wiring board with an encapsulation resin formed around the solid-state image sensing device; and a through-hole passing through the wiring board in a thickness direction is formed on outside of the opening of the wiring board.

In the above configuration, the encapsulation resin is formed around the solid-state image sensing device that is adhered to the backside of the wiring board, and the encapsulation resin seals the solid-state image sensing device to the wiring board. In other words, in the above configuration, the solid-state image sensing device is adhered to the backside of the wiring board, as well as fixed to the backside of the wiring board with the encapsulation resin formed around the solid-state image sensing device. In this manner, the solid-state image sensing device is firmly fixed to the backside of the wiring board, which makes it possible to reinforce the connection between the solid-state image sensing device and the wiring board, as well as increase the strength of the solid-state image pickup apparatus.

In addition, in the above configuration, the through-hole of the wiring board is formed on outside of the opening, within which the transparent member is located. This makes it possible to easily provide the encapsulation resin around the solid-state image sensing device, by injecting the encapsulation resin through the through-hole. This configuration can improve productivity of the solid-state image pickup apparatus, as a result of which the high-quality solid-state image pickup apparatus, in which the connection between the solid-state image sensing device and the wiring board is strong, can be manufactured at low cost.

A method according to the present invention is a method of producing a solid-state image pickup apparatus, the solid-state image pickup apparatus comprising: a solid-state image sensing device;

a wiring board including wiring to be electrically connected to the solid-state image sensing device, and having an opening passing through the wiring board in a thickness direction; and a transparent member provided above the solid-state image sensing device in such a manner that the transparent member covers a light receiving section of the solid-state image sensing device with a space between the transparent member and the light receiving section, at least a part of the transparent member being located within the opening of the wiring board, and the solid-state image sensing device having a light receiving surface adhered to a backside of the wiring board. In order to achieve the objects above, the method according to the present invention comprises the steps of:

forming the through-hole passing through the wiring board in the thickness direction on outside of the opening formed on the wiring board; and sealing the solid-state image sensing device to the wiring board with an encapsulation resin formed around the solid-state image sensing device, by injecting the encapsulation resin via the through-hole.

With the above method, the encapsulation resin is formed around the solid-state image sensing device that is adhered to the backside of the wiring board, and the encapsulation resin seals the solid-state image sensing device to the wiring board. In other words, with the above method, the solid-state image sensing device is adhered to the backside of the wiring board, as well as fixed to the backside of the wiring board with the encapsulation resin formed around the solid-state image sensing device. In this manner, the solid-state image sensing device is firmly fixed to the backside of the wiring board, which makes it possible to reinforce the connection between the solid-state image sensing device and the wiring board, as well as increase the strength of the solid-state image pickup apparatus.

In addition, with the above method, the through-hole of the wiring board is formed on outside of the opening, within which the transparent member is located. This makes it possible to easily provide the encapsulation resin around the solid-state image sensing device, by injecting the encapsulation resin through the through-hole. This configuration can improve productivity of the solid-state image pickup apparatus, as a result of which the high-quality solid-state image pickup apparatus, in which the connection between the solid-state image sensing device and the wiring board is strong, can be manufactured at low cost.

Additional objects, features, and strengths of the invention will be made clear by the description below. Further, the advantages of the invention will be evident from the following explanation in reference to the drawings.

DESCRIPTION OF THE EMBODIMENTS

Figure 1:
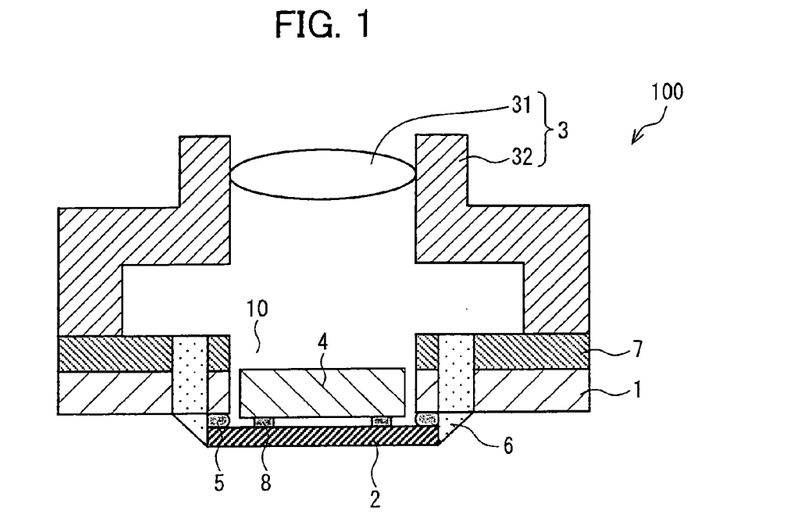
FIG. 1 is a cross-sectional view of a schematic configuration of a solid-state image pickup apparatus of the present invention.

One embodiment of the present invention is described below with reference to the drawings. FIG. 1 shows a cross-sectional view of a schematic configuration of a solid-state image pickup apparatus of the invention.

As shown in FIG. 1, a solid-state image pickup apparatus 100 mainly includes a wiring board 1, a solid-state image sensing device 2, a lens unit 3, and a transparent member 4. The wiring board 1 has an opening 10. The solid-state image sensing device 2 is adhered to a backside of the wiring board 1. The lens unit 3 is used to direct light coming from outside to the solid-state image sensing device 2. The transparent member 4 is placed above and facing the solid-state image sensing device 2. In the solid-state image pickup apparatus 100, the wiring board 1 and solid-state image sensing device 2 are electrically connected with each other via a conductive member 5.

The wiring board 1 is a board for taking out an electric signal of the solid-state image sensing device 2, and includes patterned wiring (not illustrated). The wiring board 1 is, for example, a printed board or a ceramic board. On the wiring board 1, the opening 10 passing through the wiring board 1 in a thickness direction is formed. The transparent member 4 is located within the opening 10, and the solid-state image sensing device 2 is fixed to the backside of the wiring board 1. Therefore, the opening 10 is larger in size than the transparent member 4 and smaller in size than the solid-state image sensing device 2. In addition, an electrode for external connection (not illustrated) is formed on the backside of the wiring board 1. Also, as described later, on the wiring board 1, through-holes passing through the wiring board 1 in the thickness direction are formed on outside of the opening 10.

The solid-state image sensing device 2 that is adhered to the backside of the wiring board 1 is a flat, rectangular-shaped semiconductor substrate, on which a semiconductor circuit is formed (such as a silicon monocrystalline substrate). The solid-state image sensing device 2 is, for example, a CCD (charge-coupled device) image sensor, CMOS (complementary metal-oxide semiconductor) image sensor, or VMIS image sensor (Threshold Voltage Modulation Image Sensor). On the solid-state image sensing device 2, a light receiving section (image pickup section) 21 is formed. In the light receiving section 21, light receiving elements (picture elements) are provided in matrix. The light receiving section 21 has a rectangular-shape two-dimensionally. The light receiving section 21 is placed in a center of the front side (surface) of the solid-state image sensing device 2. By the light receiving elements, a subject image formed on the light receiving section 21 (light came through the transparent member 4) is converted to an electric signal.

On the surrounding area (on the outer edge) of the solid-state image sensing device 2, an encapsulation resin 6 is provided. The encapsulation resin 6 seals the solid-state image sensing device 2 to the backside of the wiring board 1. And as described later, in the embodiment, the encapsulation resin 6 also fills up the through-holes of the wiring board 1.

The lens unit 3 directs light coming from outside to the solid-state image sensing device 2. The lens unit 3 includes a lens 31 and a lens holder (a tube, a light path-fixing device) 32 that holds the lens 31 therein. The lens unit 3 is adhered to the front side of the wiring board 1 (the opposite side of the solid-state image sensing device 2) via a resin layer 7.

The lens holder 32 is a hollow tube, inside of which the transparent member 4 is placed above and facing the solid-state image sensing device 2.

The transparent member 4 is placed in such a manner that the transparent member 4 covers the light receiving section 21 of the solid-state image sensing device 2. The transparent member 4 is adhered to the solid-state image sensing device 2 via an adhering section 8 that is formed around the solid-state image sensing device 2. That is, there will be an enclosed space (gap) formed between the transparent member 4 and the solid-state image sensing device 2. In this manner, the transparent member 4 is placed above the solid-state image sensing device 2, without contacting the solid-state image sensing device 2 (light receiving section 21). In addition, the side surface (edge surface) of the transparent member 4 and the encapsulation resin 6 function as a dam, which can prevent foreign particles (a cause of yield loss) from entering into the light receiving section 21. This makes it possible to protect the light receiving section 2 against foreign particles even when the solid-state image sensing device 2 is mounted on the wiring board 1, on which foreign particles are easily attached. As a result, yield loss can be kept at a minimum.

The transparent member 4 is formed from a material with transparency, such as glass or resin. At least a part of the transparent member 4 (at least a part that is covering the light receiving section 21) needs to be located inside the opening 10 of the wiring board 1. On the surface of the transparent member 4 (the surface facing to the lens unit 3), an optical filter (e.g., infrared cut filer) may be formed.

Figure 2:
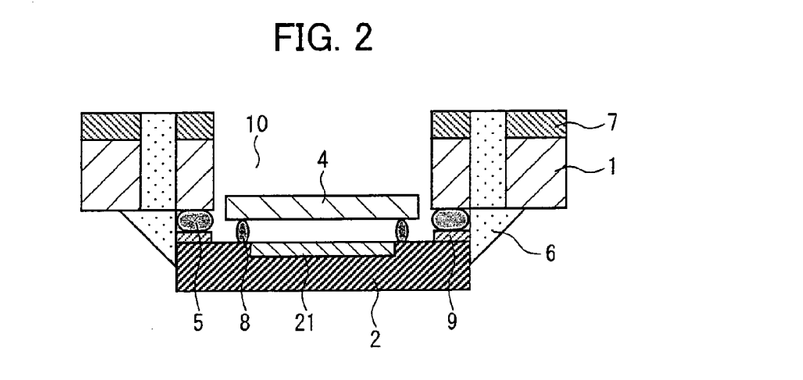
FIG. 2 is a cross-sectional view of a solid-state image sensing device and wiring board of the solid-state image pickup apparatus of FIG. 1.
Figure 3:
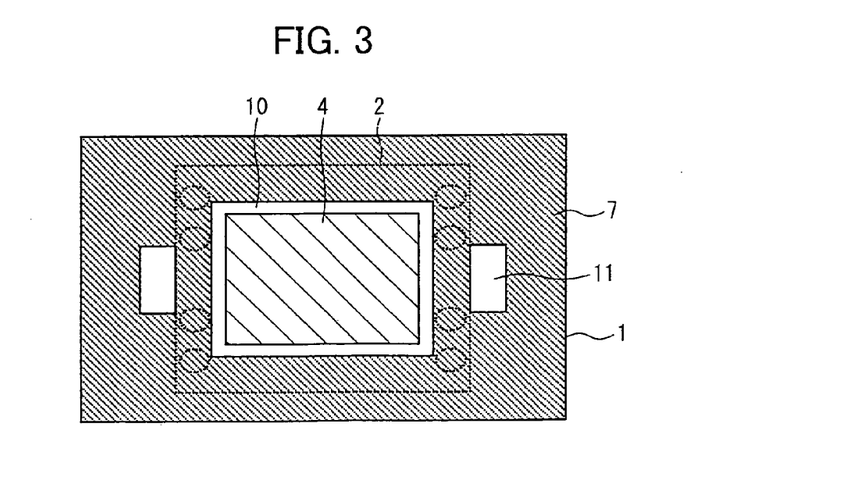
FIG. 3 is a top view of the solid-state image sensing device and wiring board of FIG. 2.

FIG. 2 shows a cross-sectional view of the configuration of the solid-state image pickup apparatus 100 of FIG. 1, except for the lens unit 3. FIG. 3 shows a top view of the solid-state image pickup apparatus 100 of FIG. 2. The encapsulation resin 6 is not illustrated in FIG. 3.

As shown in FIG. 2, on the light-receiving surface of the solid-state image sensing device 2, an electrode pad 9 is formed outside the light receiving section 21. The conductive member 5 that is formed on top of the electrode pad 9 adheres the solid-state image sensing device 2 to the backside of the wiring board 1. In this manner, the wiring board 1 and the solid-state image sensing device 2 are electrically connected with each other.

Further, in the solid-state image pickup apparatus 100 of the embodiment, through-holes 11 passing through the wiring board 1 in a thickness direction are formed on outside of the opening 10. In the embodiment, two through-holes 11 are formed along the side surface (outer edge) of the solid-state image sensing device 2, which is indicated with a dashed line of FIG. 3. The two through-holes 11 are formed on the two different sides of the solid-state image sensing device 2, the two sides being opposed to each other. And the encapsulation resin (not illustrated in FIG. 3) fills up the through-holes 11.

In the embodiment, there is no resin layer 7 formed on extension lines of the through-holes 11, and so the encapsulation resin 6 also fills up these parts.

The solid-state image pickup apparatus 100 takes light from outside, through the lens unit 3. Then the light goes through the transparent member 4 toward the light receiving section 21 of the solid-state image sensing device 2. In the light receiving section 21, the light receiving elements receive a picture image. Because there is nothing placed between the light receiving section 21 and the transparent member 4, the light came from outside and went through the transparent member 4 is to directly reach the light receiving section 21, and so there will be no light loss on the light path.

In the above configuration of the solid-state image pickup apparatus 100, the solid-state image sensing device 2 is sealed to the wiring board 1 with the encapsulation resin 6 that is formed around the solid-state image sensing device 2. That is, the solid-state image sensing device 2 is adhered to the backside of the wiring board 1 via the conductive member 5, as well as fixed to the backside of the wiring board 1 with the encapsulation resin 6 that is formed on the outer edge of the solid-state image sensing device 2. In this manner, the solid-state image sensing device 2 is firmly fixed to the backside of the wiring board 1. This makes it possible to reinforce the connection between the solid-state image sensing device 2 and the wiring board 1, as well as increase the strength of the solid-state image pickup apparatus 100 itself. The encapsulation resin 6 needs to be formed at least on the surrounding area of the solid-state image sensing device 2 so as to fix the solid-state image sensing device 2 to the backside of the wiring board 1.

In addition, in the solid-state image pickup apparatus 100 of the invention, the through-holes 11 are formed on outside of the opening 10 of the wiring board 1. Therefore, as described later, it is possible to easily provide the encapsulation resin 6 around the solid-state image sensing device 2, by injecting the encapsulation resin 6 through the through-holes 11.

The through-hole 11 may be formed anywhere as long as it is on outside of the opening 10 of the wiring board 1. But it is preferable that it be formed on the extension line of the side surface of the solid-state image sensing device 2, so that the encapsulation resin 6 can be injected through the through-hole 11 and definitely provided around the solid-state image sensing device 2 by capillary action. In this way, the sealing part of the encapsulation resin 6 can be definitely formed around the solid-state image sensing device 2. One through-hole 11 is enough for providing the encapsulation resin 6 around the solid-state image sensing device 2.

Further, in the solid-state image pickup apparatus 100, outlets of the through-holes 11 formed on the backside of the wiring board 1 are sealed with the encapsulation resin 6. This can prevent foreign particles from entering into the solid-state image sensing device 2, through the through-holes 11.

Furthermore, in the solid-state image pickup apparatus 100, the through-holes 11 are filled with the encapsulation resin 6. This can increase the strength of the wiring board 1, which has been weakened due to the formed through-holes 11. This also can increase the strength of the solid-state image pickup apparatus 100 itself.

The encapsulation resin 6 can be made either of heat-curing resin or light (e.g., ultraviolet light)-curing resin. For reinforcing the connection between the solid-state image sensing device 2 and the wiring board 1, the encapsulation resin 6 may be made either of transparent resin or light shielding resin. However, if the encapsulation resin 6 is made of light shielding resin such as colored resin, the encapsulation resin 6 will have a light blocking effect. As a result, light entering into the light receiving section 21 of the solid-state image sensing device 2 through the encapsulation resin 6 can be prevented.

Moreover, in the solid-state image pickup apparatus 100, the resin layer 7 is formed on the front side (the opposite side of the solid-state image sensing device 2) of the wiring board 1. The resin layer 7 functions as a reinforcing material for increasing the strength of the wiring board 1, so that the solid-state image sensing device 2 can be firmly mounted on the wiring board 1.

Like the encapsulation resin 6, the resin layer 7 can also be made either of heat-curing resin or light (e.g., ultraviolet light)-curing resin. For increasing the strength of the wiring board 1, the resin layer 7 may be made either of transparent resin or light shielding resin. However, if the resin layer 7 is made of light shielding resin such as colored resin, the resin layer 7 will have a light blocking effect. As a result, light entering into the light receiving section 21 of the solid-state image sensing device 2 through the resin layer 7 can be prevented. It is preferable that the resin layer 7 be adhesive resin that functions as an adhesive, so as to adhere the lens unit 3 to the wiring board 1.

As described above, a main object of the encapsulation resin 6 and the resin layer 7 is to increase the strength of the wiring board 1 (to reinforce the connection between the solid-state image sensing device 2 and the wiring board 1). Therefore, the resin need not have a light blocking effect. However, if the resin of the encapsulation resin 6 and the resin layer 7 were to have a light blocking effect, the resin not only function as a reinforcing material, but also block the light from entering into the light receiving section 21.

Figure 4:
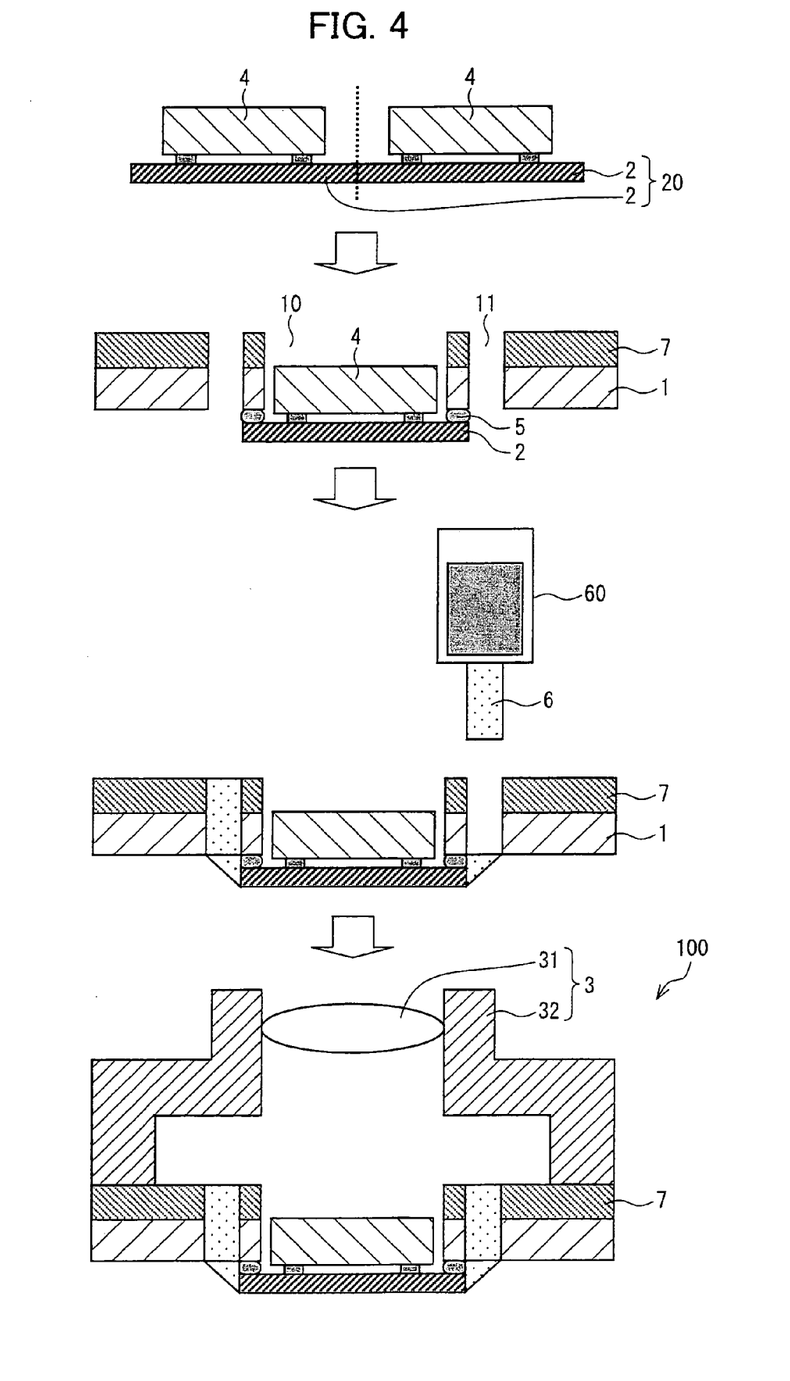
FIG. 4 is a cross-sectional view showing steps of a method for manufacturing the solid-state image pickup apparatus of FIG. 1.

Next, one embodiment of a method for manufacturing the solid-state image pickup apparatus 100 is described below with reference to FIG. 4. FIG. 4 is a cross-sectional view showing steps of a method for manufacturing the solid-state image pickup apparatus 100. The method for manufacturing the solid-state image pickup apparatus 100 includes a step, in which the encapsulation resin is injected to the surrounding area of the solid-state image sensing device and then the solid-state image sensing device is sealed to the wiring board with the encapsulation resin.

First, as shown in FIG. 4, the transparent member 4 is mounted on each solid-state image sensing device 2 of an wafer 20. The wafer 20 includes a plurality of solid-state image sensing devices 2. Then, by dicing the wafer 20 at a dashed line, single-cut solid-state image sensing devices 2 are prepared.

Next, the solid-state image sensing device 2 is mounted on the backside of the wiring board 1 via the conductive member 5. At this point, the transparent member 4 that is mounted on the solid-state image sensing device 2 is located within the opening 10 of the wiring board 1. In this step, the through-holes 11 of the wiring board 1 and the resin layer 7 should be formed in advance, but the resin layer 7 should not cover the through-holes 11.

Then, the through-holes 11 are filled with the encapsulation resin 6 injected by a resin filler 60 through the through-holes 11 of the wiring board 1, on which the solid-state image sensing device 2 is mounted. In this step, the encapsulation resin 6 is definitely provided around the solid-state image sensing device 2 by a capillary action, due to high viscosity of the resin. After that, the encapsulation resin 6 is cured.

Finally, the lens unit 3 is placed on the wiring board 1. By curing the resin layer 7, the wiring board 1 and lens unit 3 are adhered with each other. In this way, the solid-state image pickup apparatus 100 can be produced.

As described above, this method of manufacture makes it possible to produce the solid-state image pickup apparatus 100, in which the solid-state image sensing device 2 is firmly fixed to the backside of the wiring board 1. This makes it possible to reinforce the connection between the solid-state image sensing device 2 and the wiring board 1.

Moreover, the encapsulation resin 6 can be easily provided around the solid-state image sensing device 2, by injecting the encapsulation resin 6 through the through-holes 11. As a result, productivity of the solid-state image pickup apparatus 100 can be improved, as a result of which high-quality solid-state image pickup apparatus 100, in which the connection between the solid-state image sensing device 2 and the wiring board 1 is strong, can be manufactured at low cost.

Figure 5:
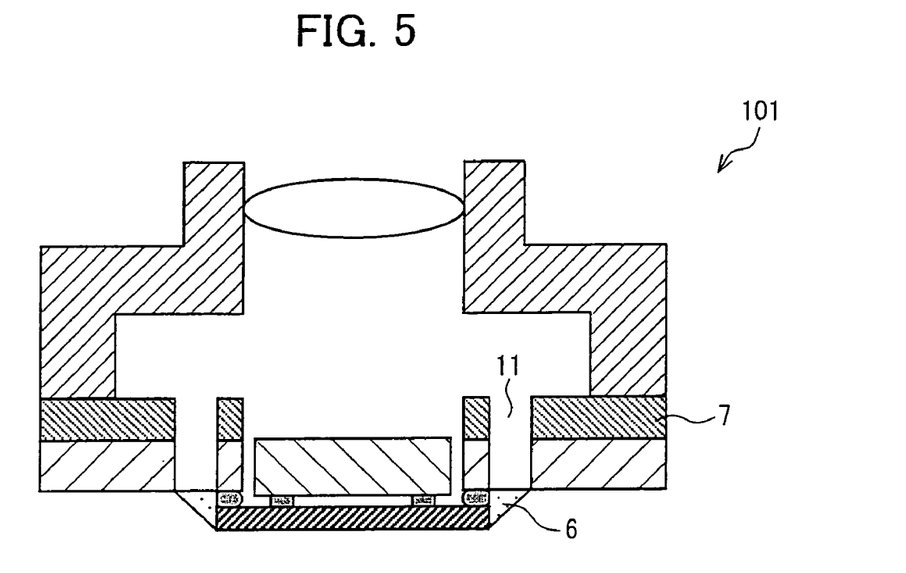
FIG. 5 is a cross-sectional view of a schematic configuration of another solid-state image pickup apparatus of the invention.
Figure 6:
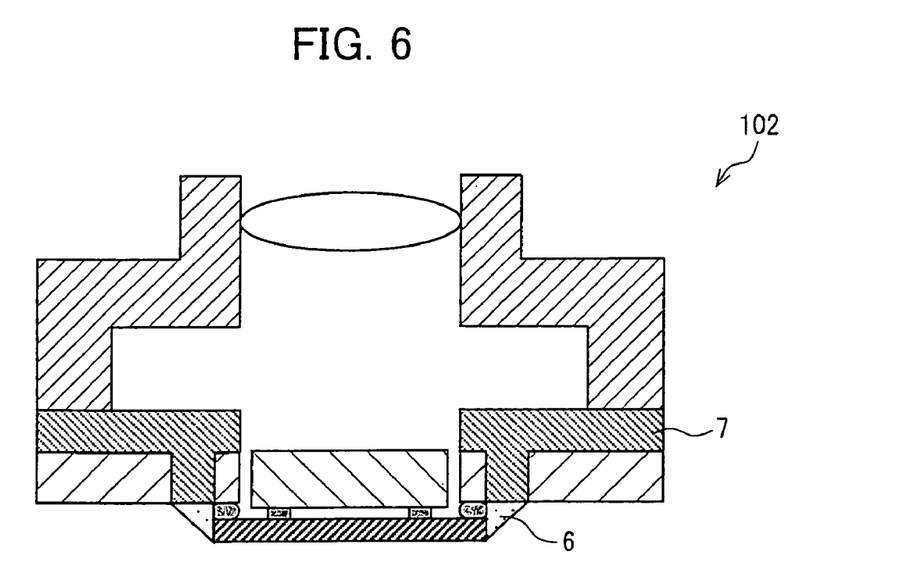
FIG. 6 is a cross-sectional view of a schematic configuration of still another solid-state image pickup apparatus of the invention.
Figure 7:
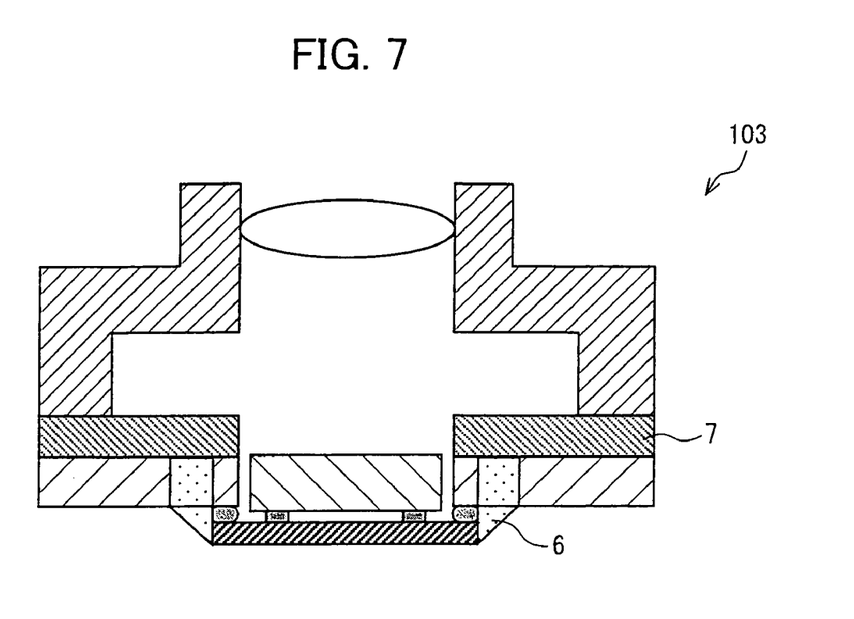
FIG. 7 is a cross-sectional view of a schematic configuration of yet another solid-state image pickup apparatus of the invention.

Moreover, the solid-state image pickup apparatus 100 may be configured as follows. FIGS. 5 to 7 are cross-sectional views of other solid-state image pickup apparatuses of the invention.

On a solid-state image pickup apparatus 101 of FIG. 5, neither encapsulation resin 6 nor resin layer 7 is formed inside through-holes 11. This configuration can also reinforce the connection between a solid-state image sensing device 2 and a wiring board 1 due to the encapsulation resin 6.

In a solid-state image pickup apparatus 102 of FIG. 6, through-holes 11 are filled with resin of resin layer 7, instead of the encapsulation resin 6. This configuration can also provide the same advantage as the configuration where the through-holes 11 are filled with the encapsulation resin 6 (the solid-state image pickup apparatus 100). In this case, unlike the method in FIG. 4, if the resin layer 7 was formed after the solid-state image sensing device 2 is mounted on the wiring board 1, the formation of the resin layer 7 and the filling the through-holes 11 with the resin of the resin layer 7 could be performed in one process concurrently.

In a solid-state image pickup apparatus 103 of FIG. 7, the through-holes 11 are filled with the encapsulation resin 6, and the resin layer 7 is formed on top of that. This configuration can also provide the same advantage as the configuration where the through-holes 11 are filled with the encapsulation resin 6 (the solid-state image pickup apparatus 100).

The solid-state image pickup apparatus of the invention is suitably applicable to electronic devices that can take pictures, such as a mobile phone having a camera, digital steel camera, video camera, and security camera.

In the embodiments, each of the opening 10 and through-holes 11 on the wiring board 1 are formed separately. However, even if the through-holes 11 and the opening 10 are connected, the same advantage as the embodiment can be achieved.

As described above, a solid-state image pickup apparatus of the present invention has a configuration, in which the solid-state image sensing device is sealed to the wiring board with the encapsulation resin formed around the solid-state image sensing device. And, the method for manufacturing the solid-state image pickup apparatus of the present invention has steps of forming the through-hole passing through the wiring board in the thickness direction on the outside of the opening formed on the wiring board, and sealing the solid-state image sensing device to the wiring board with the encapsulation resin formed around the solid-state image sensing device, by injecting the encapsulation resin via the through-hole.

Therefore, it is possible to reinforce the connection between the solid-state image sensing device and the wiring board, and as a result, also possible to increase the strength of the solid-state image pickup apparatus. In addition, the encapsulation resin can be easily provided to the surrounding area of the solid-state image sensing device. This configuration can improve productivity of the solid-state image pickup apparatus, as a result of which the high-quality solid-state image pickup apparatus, in which the connection between the solid-state image sensing device and the wiring board is strong, can be manufactured at low cost.

In the solid-state image pickup apparatus of the present invention, it is preferable that the through-hole be formed on the extension line of the side surface of the solid-state image sensing device.

In the above configuration, the through-hole is formed on the extension line of the side surface of the solid-state image sensing device. This makes it possible for the encapsulation resin to be injected through the through-hole, and the injected encapsulation resin is definitely provided around the solid-state image sensing device by capillary action. That is, the encapsulation resin can be definitely provided to the surrounding area of the solid-state image sensing device.

In the solid-state image pickup apparatus of the present invention, it is preferable that the encapsulation resin seal an outlet of the through-hole formed on the backside of the wiring board.

In the above configuration, the outlet of the through-hole formed on the backside of the wiring board is sealed with the encapsulation resin. This can prevent foreign particles from entering through the through-hole into the solid-state image sensing device.

In the solid-state image pickup apparatus of the present invention, it is preferable that the through-hole be filled with the encapsulation resin.

In the above configuration, the through-hole is filled with the encapsulation resin. This can increase the strength of the wiring board that has been weakened due to the formed through-hole. This means that it is also possible to increase the strength of the solid-state image pickup apparatus itself.

In the solid-state image pickup apparatus of the present invention, it is preferable that a resin layer be formed on the front side of the wiring board.

In the configuration of the patent document 1, no resin layer is formed on the wiring board. Therefore, because of the wiring forms, pressure imposed on the wiring board when the solid-state image sensing device is mounted is dispersed. This results in a state in which the connection between the solid-state image sensing device and the wiring board is not stable.

As against the configuration of the patent document 1, in the above configuration, the resin layer is formed on the front side (opposite side of the solid-state image sensing device) of the wiring board. In this configuration, the resin layer functions as a reinforcing material for increasing the strength of the wiring board. This makes it possible to firmly mount the solid-state image sensing device on the wiring board.

In the solid-state image pickup apparatus of the present invention, it is preferable that the resin layer be made of a material with a light blocking effect.

The above configuration means that the resin layer has a light blocking effect. As a result, light entering into the light receiving section of the solid-state image sensing device through the resin layer can be prevented.

In the solid-state image pickup apparatus of the present invention, it is preferable that the encapsulation resin be made of a material with a light blocking effect.

The above configuration means that the encapsulation resin has a light blocking effect. As a result, light entering into the light receiving section of the solid-state image sensing device through the encapsulation resin can be prevented.

The invention can be preferably employed for a solid-state image pickup apparatus that is to be mounted on mobile terminals such as communication devices, which have been required to be smaller and thinner. In addition, the invention can provide a high-quality solid-state image pickup apparatus at low cost.

The invention is not limited to the description of the embodiments above, but may be altered within the scope of the claims. An embodiment based on a proper combination of technical means disclosed in different embodiments is encompassed in the technical scope of the invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A solid-state image pickup apparatus comprising:
a solid-state image sensing device;
a wiring board including wiring to be electrically connected to the solid-state image sensing device, and having an opening passing through the wiring board in a thickness direction; and
a transparent member provided above the solid-state image sensing device in such a manner that the transparent member covers a light receiving section of the solid-state image sensing device with a space between the transparent member and the light receiving section, at least a part of the transparent member being located within the opening of the wiring board; and
the solid-state image sensing device having a light receiving surface adhered to a backside of the wiring board, wherein the solid-state image sensing device is sealed to the wiring board with an encapsulation resin formed around the solid-state image sensing device; and a through-hole passing through the wiring board in a thickness direction is formed on outside of the opening of the wiring board.

2. The solid-state image pickup apparatus according to claim 1, wherein the through-hole is formed on an extension line of a side surface of the solid-state image sensing device.

3. The solid-state image pickup apparatus according to claim 1, wherein the encapsulation resin seals an outlet of the through-hole formed on the backside of the wiring board.

4. The solid-state image pickup apparatus according to claim 1, wherein the through-hole is filled with the encapsulation resin.

5. The solid-state image pickup apparatus according to claim 1, further comprising a resin layer formed on front side of the wiring board.

6. The solid-state image pickup apparatus according to claim 5, wherein the resin layer is made of a light shielding material.

7. The solid-state image pickup apparatus according to claim 1, wherein the encapsulation resin is made of a light shielding material.

8. The solid-state image pickup apparatus according to claim 1, further comprising an adhering section formed around the light receiving section of the solid-state image sensing device, and the transparent member is adhered to the solid-state image sensing device via the adhering section.

9. The solid-state image pickup apparatus according to claim 5, wherein the resin layer is made of an adhesive resin, so that a lens unit for directing external light to the solid-state image sensing device is adhered to the wiring board.

10. An electronic device, including a solid-state image pickup apparatus, the solid-state image pickup apparatus comprising:
- a solid-state image sensing device;
- a wiring board including wiring to be electrically connected to the solid-state image sensing device, and having an opening passing through the wiring board in a thickness direction; and
- a transparent member provided above the solid-state image sensing device in such a manner that the transparent member covers a light receiving section of the solid-state image sensing device with a space between the transparent member and the light receiving section,
- at least a part of the transparent member being located within the opening of the wiring board;
- the solid-state image sensing device having a light receiving surface adhered to a backside of the wiring board;
- the solid-state image sensing device being sealed to the wiring board with an encapsulation resin formed around the solid-state image sensing device; and
- the wiring board having a through-hole in a thickness direction formed on outside of the opening of the wiring board.

* * * * *